United States Patent
Sherrington et al.

(10) Patent No.: US 7,332,086 B2
(45) Date of Patent: Feb. 19, 2008

(54) METHOD FOR PREPARING A SEPARATION MEDIUM

(75) Inventors: David C. Sherrington, Glasgow (GB); Hanna Mouaziz, Lyons (FR); Karol Lacki, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 160 days.

(21) Appl. No.: 11/332,033

(22) Filed: Jan. 13, 2006

(65) Prior Publication Data
US 2006/0118483 A1   Jun. 8, 2006

Related U.S. Application Data

(63) Continuation of application No. 10/800,085, filed on Mar. 10, 2004, now abandoned.

(30) Foreign Application Priority Data
Mar. 14, 2003   (SE) .................................. 0300726

(51) Int. Cl.
*B01D 15/08*   (2006.01)
(52) U.S. Cl. .................. 210/635; 210/656; 210/198.2; 210/502.1; 502/402; 502/439
(58) Field of Classification Search ................ 210/635, 210/656, 659, 198.2, 502.1; 502/400, 402, 502/439
See application file for complete search history.

(56) References Cited

U.S. PATENT DOCUMENTS

| 3,782,075 A | 1/1974 | Kirkland |
| 4,070,286 A | 1/1978 | Iler et al. |
| 4,137,208 A | 1/1979 | Elliott |
| 4,191,672 A | 3/1980 | Salome et al. |
| 5,019,270 A | 5/1991 | Afeyan et al. |
| 5,246,577 A | 9/1993 | Fuchs et al. |
| 5,346,986 A | 9/1994 | Schneider et al. |
| 5,540,834 A | 7/1996 | Carr et al. |
| 5,728,457 A | 3/1998 | Frechet et al. |
| 5,738,790 A | 4/1998 | Hagen et al. |
| 6,011,089 A | 1/2000 | Davies et al. |
| 6,174,946 B1 | 1/2001 | Rubenacker et al. |
| 6,423,410 B1 | 7/2002 | Sucholeiki et al. |
| 6,586,534 B1 | 7/2003 | Rubenacker et al. |
| 6,599,620 B2 | 7/2003 | Fujita et al. |
| 6,645,901 B2 | 11/2003 | Goto et al. |

FOREIGN PATENT DOCUMENTS

| EP | 0 750 007 | 12/1996 |
| EP | 0 442 977 | 5/1999 |
| WO | WO 91/00762 | 1/1991 |

*Primary Examiner*—Ernest G. Therkorn
(74) *Attorney, Agent, or Firm*—Yonggang Ji

(57) ABSTRACT

The present invention relates to a method of preparing a separation medium starting with an aqueous solution of spherical and preferably functionalised primary particles of defined size, comprising the following steps:
 a) inverse suspension dispersing said aqueous solution of primary particles as droplets in oil;
 b) evaporation to remove said aqueous solution and fusion between particles to form spherical aggregates;
 c) size fractionation of aggregates from step b); and optionally
 d) repeating steps a) to c) an optional number of times to form progressively larger spherical aggregates.

The invention also relates to a separation medium produced by this method. The present separation medium can be used in chromatography in the form of essentially spherical aggregates in packed or expanded bed columns or in the form of assembled aggregates on a support for filtration purposes.

7 Claims, 2 Drawing Sheets

Assembly of latex particles by inverse suspension process

Figure 1 Assembly of latex particles by inverse suspension process

METHOD FOR PREPARING A SEPARATION MEDIUM

CROSS-REFERENCE TO RELATED APPLICATIONS

This application is a continuation of U.S. patent application Ser. No. 10/800,085 filed on Mar. 10, 2004, abandoned, which claims priority to Swedish patent application number 0300726-7 filed Mar. 14, 2003; the entire disclosures of which are incorporated herein by reference in their entireties.

TECHNICAL FIELD

The present invention relates to a method of preparing a separation medium, which is useful e.g. in chromatography and filtration. Further, the invention encompasses a novel separation medium as such and use thereof to separate a compound from a liquid. More closely, the invention relates to fractal particles for chromatography media.

BACKGROUND OF INVENTION

Separation media, such as chromatography media and filtration media, are often associated with non-satisfactory properties to some end. Important factors in this field are e.g. the mass transport properties of the media, the flow properties thereof when used in chromatographic columns or as membranes, cumbersome and non-reliable methods of preparation etc. Hence, there is an ongoing development to seek improvements in this field.

Reeder, et al. (An approach to hierarchically structured porous zirconia aggregates. Reeder et al., Dep. Chem. Eng., Univ. Minnesota, Minneapolis, Minn., USA. Journal of Colloid and Interface Science (1996), 184(1), 328-330) disclose an approach to aggregate colloids into hierarchically structured spherical particles. Successive aggregation steps are used to assemble an inorganic particle that is self-similar on 2 size scales and is permeated by an ordered pore network with a bidisperse size distribution. The structure of the micro- and macro-pore networks as well as the mechanical integrity of the structure can be controlled by varying sintering conditions. One drawback of the disclosed aggregation is that the successive steps required will render the preparation thereof time-consuming and costly. This approach is also limited to inorganic particles that can be sintered.

U.S. Pat. No. 4,070,286 disclose a powder of discrete, macroporous, microspheroids each composed of a plurality of large colloidal particles joined and cemented together at their points of contact by non-porous amorphous silica. The cementing is done with a partial sintering process, which is only possible for inorganic materials. Also, the coacervation process described makes it difficult to control the sphericity of the aggregates.

O. D. Velev, K. Furusawa, K. Nagayama, have in *Langmuir*, 12, 2374-2384 (1996), *Langmuir*, 12, 2385-2391 (1996) and *Langmuir*, 13, 1856-1859 (1997) described assembly of latex particles into spherical aggregates by using emulsion droplets as colloid templates. The aqueous latex solution is dispersed by a homogenizer inside anhydrous octanol medium. The removal of water occurs by partitioning into the octanol phase. This means that it starts as soon as the phases are brought into contact with each other, leaving no time for controlled emulsification to produce the required droplet size. The amount of water that can be removed is also limited by the equilibrium water solubility in the amount of octanol present.

U.S. Pat. No. 6,599,620 relates to a cellulosic particle body comprising interconnected cellulosic small particles with small interparticle spaces and to method for production thereof comprising dispersing small cellulosic particles in an alkaline medium and contacting the resulting suspension with a coagulating solution. The precipitation of the binder in the coagulating solution proceeds in an uncontrolled fashion and it is difficult to obtain desired open pore structures. The spraying processes involved also make it difficult to obtain aggregate sizes suitable for chromatography and in sufficient yield.

U.S. Pat. No. 3,782,075 discloses a packing material for chromatography columns, prepared from a powder of uniform-sized porous microspheres composed of a plurality of interconnected colloidal oxide particles. The size of the pores is controlled by the size of the colloidal particles used to form the microspheres and the surface area of the microsphere is controlled by the amount of sintering used to impart strength to the particles. The primary particles are joined together by sintering, which limits the applicability to inorganic particles.

EP 0 442 977 relates to a chromatography method using a matrix comprising interconnected first and second throughpore sets. The members of the first throughpore set have a greater mean diameter than the members of the second throughpore set. The second throughpore set is in fluid communication with solute interactive regions which interact reversibly with solutes to effect chromatographic separation thereof. The method of preparing the matrix appears unclear and not fully reproducible which means that not all batches will show effects of a hierarchical structure. Furthermore, it may be difficult to control sizes and connect throughpores with this method.

In spite of all prior art within this technical field, there is still a need in this field of improved methods to prepare separation media as well as of novel separation media.

Definitions

The term "hierarchical" or "fractal" is used herein to describe a porous structure with large pores open to the exterior. On the walls of these large pores, a system of smaller pores opens. Optionally, a further system of even smaller pores may open on the walls of these pores etc.

The term "separation medium" is used herein in a broad sense to include any material that is useful as the stationary phase in a separation method, such as a chromatographic process or a filtration. The medium can be used as such or combined with another material, such as a rigid support in a filtration. Further, a "separation medium" as used herein will include both materials that are directly useful for adsorption or sieving and such materials having additional adsorbing groups, known as ligands, coupled thereon.

SUMMARY OF THE INVENTION

One object of the invention is to provide a method of preparing a separation medium of synthetic polymers with fractal or hierarchical pore structure. The objective method should be fully controllable and the pores fully accessible and permeable.

Another object of the invention is to provide a separation medium with improved mass transport properties as compared to the prior art media.

A further object of the invention is to provide a separation medium, which is useful in chromatography, either in particle form, e.g. in packed or expanded bed adsorption, or in the form of a membrane.

Yet another object of the invention is to provide a separation medium, which exhibits one or more ligands which may be of different kind in case of more than one type of ligand.

A further object of the invention is to provide a separation medium, which is especially suitable for use in expanded bed adsorption (EBA). This can be achieved according to the invention by a separation medium, the weight of which is suitable for expanded beds.

Thus, in a first aspect the invention relates to a method of preparing a separation medium starting with an aqueous solution of essentially spherical primary particles of defined size, comprising the following steps:
a) inverse suspension dispersing said aqueous solution of primary particles as droplets in oil;
b) evaporation to remove said aqueous solution and fusion between primary particles to form spherical aggregates (beads);
c) size fractionation of aggregates from step b); and optionally
d) repeating steps a) to c) an optional number of times to form progressively larger spherical aggregates. In case of repeating steps a)-c), the aggregates from step c) are first suspended in aqueous solution.

The primary particles are preferably 50-1000 nm in diameter.

The primary particles are made of a synthetic polymer selected from the group that consists of polymerised styrene and/or divinylbenzene, (meth)acrylates, vinyl esters, vinyl ethers, vinyl amides, meth(acrylamides), dienes, etc. or a mixture of two or more thereof. Preferably the primary particles are surrounded by a soft shell made of for example polyacrylate.

Preferably, the primary particles are functionalised with, for example, carboxy, epoxy or amino groups.

The fusion in step b) is preferably caused by a water-soluble polymer and a cross-linker in sufficient quantity, i.e. the minimum amount that gives the required mechanical stability, such as at least a mass ratio of 0.3:100.

Preferably, the water-soluble polymer is polyethyleneimine and the cross-linker is chosen from N,N'-methylenebisacrylamide and diacryloyl piperazine.

Alternatively, the soft shells adhere to each other without any fusion promoting agent. Yet another alternative, is thermal fusion of the particles in step b).

In a second aspect, the invention relates to a separation medium comprised of one or more aggregates, wherein each aggregate comprises a plurality of porous and essentially spherical synthetic polymer beads assembled into essentially spherical aggregates of controlled size.

The medium has a mass ratio of synthetic polymer:beads in each aggregate of about 0.1:100 to about 10:100, preferably from 0.3:100 to 3:100.

The beads comprise a synthetic polymer selected from the group that consists of polymerised styrene and/or divinylbenzene, (meth)acrylates, vinyl esters, vinyl ethers, vinyl amides, meth(acrylamides), dienes, etc. or a mixture of two or more thereof.

Preferably, the polymers have been chemically crosslinked or can be crosslinked at a later stage. Alternatively, the polymers may be thermally fused. The medium may exhibits one kind or two different kinds of ligand coupled to the beads within the aggregates.

An aggregate is comprised of at least about 10, and preferably at least about 20, beads and may contain up to 400 beads.

In the medium, the aggregates are separate and essentially spherical entities, which medium is suitable for use in packed or expanded bed adsorption. The medium is also suitable for reverse phase and size exclusion chromatography.

The medium may also be a membrane comprised of a plurality of aggregates provided on a support, which medium is suitable for use in filtration.

In a third aspect, the invention relates to a process for isolating at least one compound from a sample comprising the steps of contacting said sample with a separation medium as defined above, or a separation medium prepared as above, to purify the compound by said medium, for example by adsorption.

Further objects and advantages of the present invention will appear from the claims and the detailed description that follows below.

DETAILED DESCRIPTION OF INVENTION

The present invention provides methods for designing porous media with a fractal structure, starting with small primary particles (nm), which are progressively clustered into larger aggregates (□m) via a conglomeration procedure.

Figure 1:
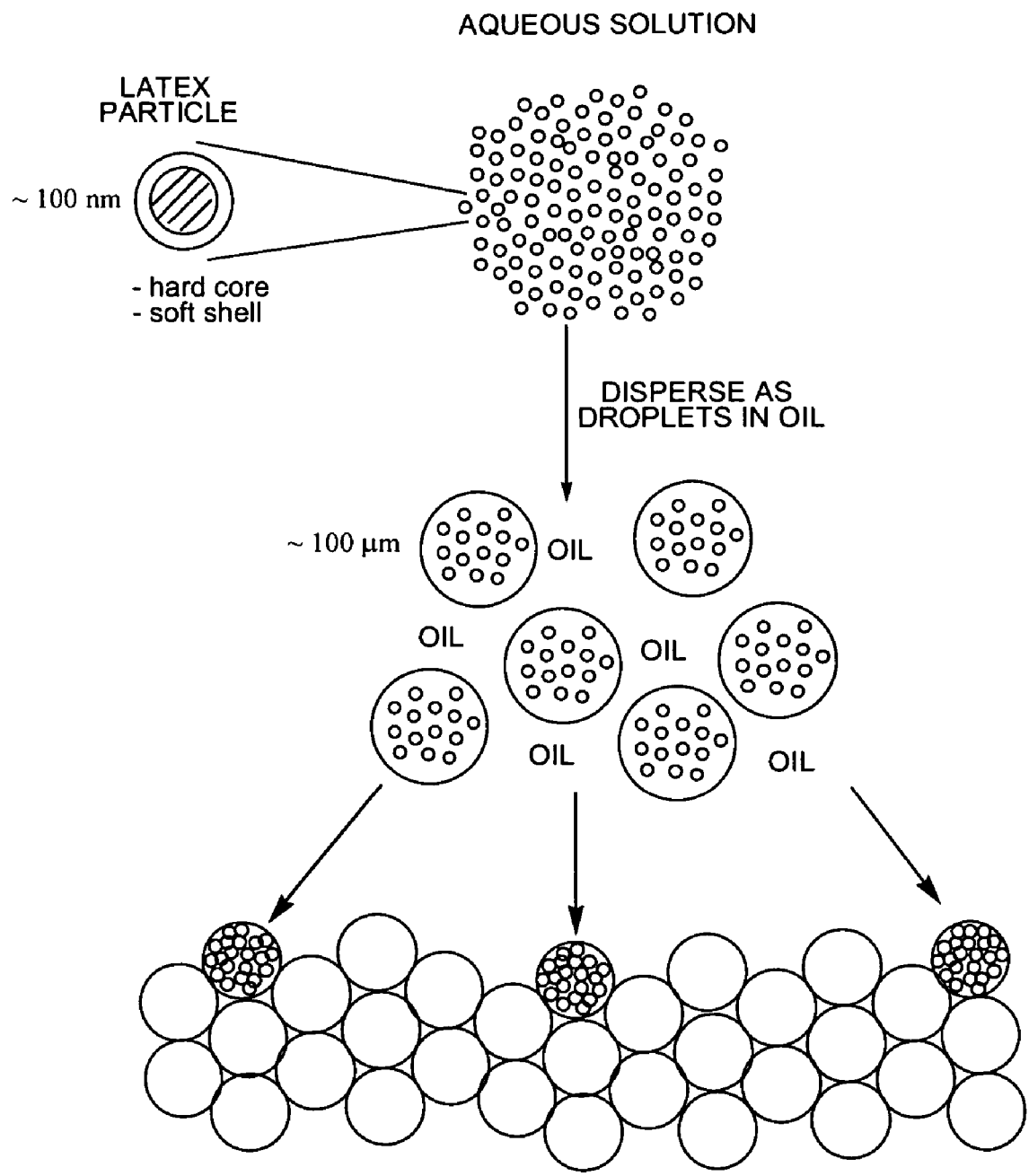
FIG. 1 is a schematic view of the assembly of latex particles by an inverse suspension process of the invention.

The present invention provides a novel approach by using an inverse suspension process (water in oil) from monodisperse latex spheres. The basic principles of the method according to the invention are illustrated in FIG. 1.

The first step concerns the synthesis of primary latex particles. Monodisperse latex spheres have been obtained by free-emulsion copolymerisation between styrene and methacrylic acid, glycidyl methacrylate and aminoethylmethacrylate in order to get functionalised latices for further derivatisation. In this way different functionalised latices with carboxy, epoxy and amino functions were obtained, varying the ratio between comonomers and varying the solids content percentage.

The second step is formation of spherical aggregates by inverse suspension process starting with dispersing the aqueous solution of primary latex particles as droplets in oil. Then a fusion between functionalised latices and an appropriate agent or "glue" should occur in each droplet in order to obtain spherical aggregates with a defined size. Preferably, fusion is effected by addition of different water-soluble compounds acting as a "glue" between particles to stabilise them. Among all the different compounds used as a glue between latex particles, the water-soluble polymer: polyethyleneimine and the cross-linkers N,N'-methylenebisacrylamide and diacryloyl piperazine gave the best results. This second step makes the aggregates less fragile and easier to manipulate.

During the aggregation and self-assembly step, thermal fusion of the latex particles may also be obtained by the high temperature used for the evaporation.

The inverse suspension process is preferably repeated at least once to form aggregates of latex particles of larger size in the micron range.

The discontinuous phase used is preferably a concentrated latex solution (such as 33% solids content) in order to increase the probability of aggregate formation. The continuous phase is preferably toluene.

According to the present invention the inverse suspension process is combined with evaporation to remove water in the aggregates. In a preferred embodiment, the evaporation is carried out from an azeotrope-forming system, so that the mixed water-solvent vapours can be condensed in e.g. a Dean-Stark trap where two separate phases are formed. The solvent phase can then be returned to the suspension, while the water phase is removed. This also provides a possibility to monitor the amount of water removed from the system at a given time.

During the Dean-stark process the temperature is high enough to cause thermal fusion of the latex particles and this gives improved mechanical and solvent stability of the aggregates. The fusion temperature may be controlled by controlling the comonomer composition.

The third step is size fractionation of aggregates from the second step. This can be done with conventional classification methods, such as sieving, sedimentation, elutriation, hydrocyclones etc.

The method of the invention leads to stable and spherical aggregates. The aggregates can be cleaned and dried without destroying the spherical structure.

Depending on the starting materials used, the present separation medium can be further derivatised with ligands i.e. binding groups suitable for chromatography. Techniques for derivatisation of synthetic polymers, such as latex, are well known in this field, for more details see e.g. a) Ion exchangers, Ed K Dorfner, Walter de Gruyter Berlin 1991, b) M Leonard, J Chromatogr B 699, 3-27 (1997), c) Uniform latex particles, L B Bangs, Seradyn Inc, Indianapolis 1984.

A second aspect of the present invention is a separation medium comprised of one or more essentially spherical aggregates, wherein each aggregate comprises a plurality of porous and essentially spherical polymer beads assembled into aggregates by an inverse suspension process. The present separation medium can be used e.g. as the stationary phase in chromatography or as a membrane in filtration processes.

In an advantageous embodiment, the polymers have been chemically crosslinked. Aggregates comprised of chemically crosslinked polymers may provide a more tolerant separation medium than other embodiments, for example as concerns cleaning and/or packing procedures using rougher methods. In an advantageous embodiment, the pore size and pore distribution within the present medium are similar to the properties of commercially available beads of such synthetic polymers, such as styrene-divinylbenzene beads from Amersham Biosciences, Polymer Laboratories, Perseptive Biosystems etc or methacrylate beads from Tosoh, Merck, Bio-Rad etc.

Accordingly, since the beads that constitute the aggregates are porous in themselves, the aggregates according to the present invention will present a hierarchical pore structure.

As regards the size of the aggregates, a minimal number of beads will in practise be required to form a spherically shaped aggregate, but this number will e.g. depend on the size of the beads. In one embodiment, the average aggregate in the present medium is comprised of at least about 10 beads in diameter, and preferably at least about 20, such as at least 100 beads in diameter. The desired upper limit of the number of beads in each aggregate will depend on the intended use thereof. Thus, in one embodiment, the average aggregate in the present medium is comprised of up to about 400 beads in diameter, such as up to about 200 beads in diameter. Accordingly, the size of the present aggregates can vary within wide limits, such as from a few μ up to several hundreds or even a thousand μ in particle diameter, e.g. between about 50 and 2000 μm, such as 100-1000 μm.

As mentioned above, the number of beads in each aggregate i.e. the size of the aggregate is controlled by the initial size of the primary particles as well as on the number of times the inverse suspension process is repeated. Thus, by selection of the appropriate parameters during the preparation, an aggregate of desired size can be prepared.

In an advantageous embodiment of the present medium, the shape of the aggregates is essentially spherical. A spherical shape is advantageous e.g. in chromatographic processes, since it improves the flow properties of an aggregate used as a stationary phase.

The aggregates can comprise one of the above-mentioned kind of beads or a mixture of such beads. Further, the beads can be of essentially the same size or of sizes that varies within a certain range. Commercially available beads are generally available either in one defined size or of a size within a certain range. The intended use of the aggregates will decide whether beads of one or more sizes are desired.

Thus, the aggregates according to the invention will exhibit equivalent binding properties as the beads included therein, since the surfaces of the beads will also be available in a separation medium comprising such beads. Accordingly, a first separation property or function will be provided by the included beads. Illustrative examples of such properties are e.g. ion-exchange ligands, affinity groups, hydrophobically interactive surfaces etc.

In an advantageous embodiment, the present medium has been prepared by a method as defined above.

As mentioned above, the present medium can e.g. be used in chromatography or in filtration. Thus, the beads may have been derivatised as discussed above to provide suitable binding groups. As is easily realised, the nature of the binding groups will decide what kind of chromatography the present separation medium is useful in, e.g. ion exchange chromatography, affinity chromatography, hydrophobic interaction chromatography etc.

Thus, in one embodiment, the medium is comprised of a plurality of the above-defined aggregates as separate and essentially spherical entities and is suitable for use in packed or expanded bed adsorption. Such chromatographic methods are well known to the skilled person in this field.

In an alternative embodiment, the medium is a membrane comprised of a plurality of said aggregates assembled onto a support and suitable for use in filtration. The preparation of a membrane from an adsorbing medium such as the present is well known to the skilled person in this field.

A last aspect of the present invention is a process for separating at least one compound from a liquid comprising the steps of contacting said liquid with a separation medium according to the invention or prepared according the invention to adsorb the compound to said medium. Methods of chromatography are well-known in this field and the skilled person can easily adapt the process in suitable ways. In brief, in a first step, a solution comprising a desired compound is passed over a separation medium according to the invention under conditions allowing adsorption of the compound to ligands i.e. binding groups present on said matrix. Such conditions are controlled e.g. by pH and/or salt concentration i.e. ionic strength in the solution. Care should be taken not to exceed the capacity of the medium, i.e. the flow should be sufficiently slow to allow a satisfactory adsorption. In this step, other components of the solution will pass through in principle unimpeded. Optionally, the medium is then washed, e.g. with an aqueous solution, in order to remove retained and/or loosely bound substances. In a next step, a second solution denoted an eluent is passed over the medium under conditions that provide desorption i.e. release of the desired compound. Such conditions are commonly a decrease of the pH and/or an increase of the salt concentration i.e. ionic strength. As the pH drops, the net charge on the compound will change as it becomes more positive, and hence alter many of the opportunities that it has for electrostatic interactions. Similarly, the increase of the ionic strength by addition of a salt will also alter the affinity between the compound and the ligand. If more than one compounds are present in the liquid, other compounds than the desired one may adsorb to the medium. The desired compound and any further compound(s) will subsequently be available for selective elution since they desorb from the medium at different conditions.

The desired compound may be a any compound, such as a recombinantly produced protein, peptide, nucleic acid, virus etc, or alternatively an undesired contaminant, such as an organic compound, which it is desired to remove from a liquid.

As an illustrative example of separation of a desired target compound, plasmid purification is mentioned. In this case, the relatively large size of the pores of the aggregates of the present separation medium is advantageous, such as 0.5-2 µm.

Another application where the present invention may prove especially advantageous is in expanded bed adsorption chromatography, where a certain minimum density of the particles is desired. Such a density is easily provided by the aggregates according to the invention.

Additional applications of the present aggregates are e.g. as carriers in cell culture, in which case larger beads are advantageous, optionally of a relatively wide spread size distribution, or as carriers in various delivery systems, such as drug delivery.

EXAMPLES

The present examples are provided for illustrative purposes only and illustrate certain embodiments of the instant invention. They are not intended to be illustrative of all embodiments of the present invention as recited in the claims.

I. Synthesis of Primary Latex Particles

General Procedure for Emulsion Polymerisation

Distilled and deionised water is added in a four-necked double jacket reactor (250 mL) filled with a nitrogen bubbler, stirring paddle and condenser. Nitrogen is bubbled through the water until the system reach thermal equilibrium at the reaction temperature. Monomers are then introduced and the mixture is vigorously stirred and purged with nitrogen for 15 min (430 rpm). The initiator is then added, dissolved in a known amount of water. The flow of nitrogen to the bubbler was then reduced to minimize the stripping of the monomer from the reaction mixture and the stirring rate is reduced (350 rpm). The mixture is stirred and allowed to react for 24 h at constant temperature. After 24 h, the reaction mixture is cooled and filtered through glass wool to remove any coagulum.

Carboxy-functional latex: Poly(Styrene/Methacrylic acid),
Reaction temperature=70° C.,
Initiator=ammonium persulfate, $C=1.4 \cdot 10^{-3}$ mol.L$^{-1}$
Epoxy-functional latex: Poly(Styrene/Glycidyl methacrylate),
Reaction temperature=65° C.
Initiator=potassium persulfate, $C=2.07 \cdot 10^{-3}$ mol.L$^{-1}$
Amino-functional latex: Poly(Styrene/Aminoethylmethacrylate hydrochloride)
Reaction temperature=70° C.
Initiator=V50 (2,2'-azobis(2-amidinopropane)dihydrochloride, $C=5.89 \cdot 10^{-3}$ mol.L$^{-1}$ Chemical Modification of Carboxy-Functional Latex (Styrene: MA: 90:10)

After centrifugation twice in distilled water of 1.5 mL of latex, this was diluted in 6 mL of distilled water and 1 equivalent of amino ethyl methacrylate hydrochloride (AEMH) (m=0.024 g) and 1 equivalent of EDC (m=0.0367 g) were added. Then, pH was adjusted to 6-7 with hydrochloric acid 1 M. Then the mixture is stirred at 4° C. during 2 hours. Then, the mixture is let at room temperature overnight. After the end of the reaction, the mixture is centrifuged several times with 0.1 M NaCl solution.

This procedure provides a crosslinkable shell and a hard core of the primary particle.

II. Fusion of Primary Particles and Formation of Spherical Aggregates by Inverse Suspension Polymerisation Inverse suspension polymerisation is a copolymerisation process conducted in a dispersed aqueous phase containing all the ingredients needed for the formation of the network. The resulting spherical particles are easily removed by filtration or centrifugation from the continuous organic phase. The discontinuous phase used is a concentrated latex solution (33% solids content) in order to increase the probability of aggregate formation.

General Procedure for Large Scale Inverse Suspension Process with Dean-Stark Distillation Apparatus Latex (4.5 mL: 1.485 g) is centrifuged twice in distilled water. For some experiments, defined amounts of water-soluble compounds and of initiator have been added to the aqueous solution of latex. The discontinuous phase obtained is let at room temperature. Continuous phase is prepared by dissolving sorbitan monooleate (2 g, C=0.1037 M) in 45 mL of toluene. Then this mixture is purged with nitrogen until temperature reached its equilibrium (T=70° C.). Agitation is maintained at 500 rpm. Then the discontinuous phase is added. After the formation of the aggregates after half an hour, we start to increase the temperature until Dean-Start distillation temperature (T=105° C.). During the aggregation and self-assembly step, thermal fusion of the latex particles occurs. After the reaction had been cooled, the supernatant is removed and then some clean toluene is added. The aggregates are then cleaned with some heptane and dried in an oven at 40° C.

Figure 2:
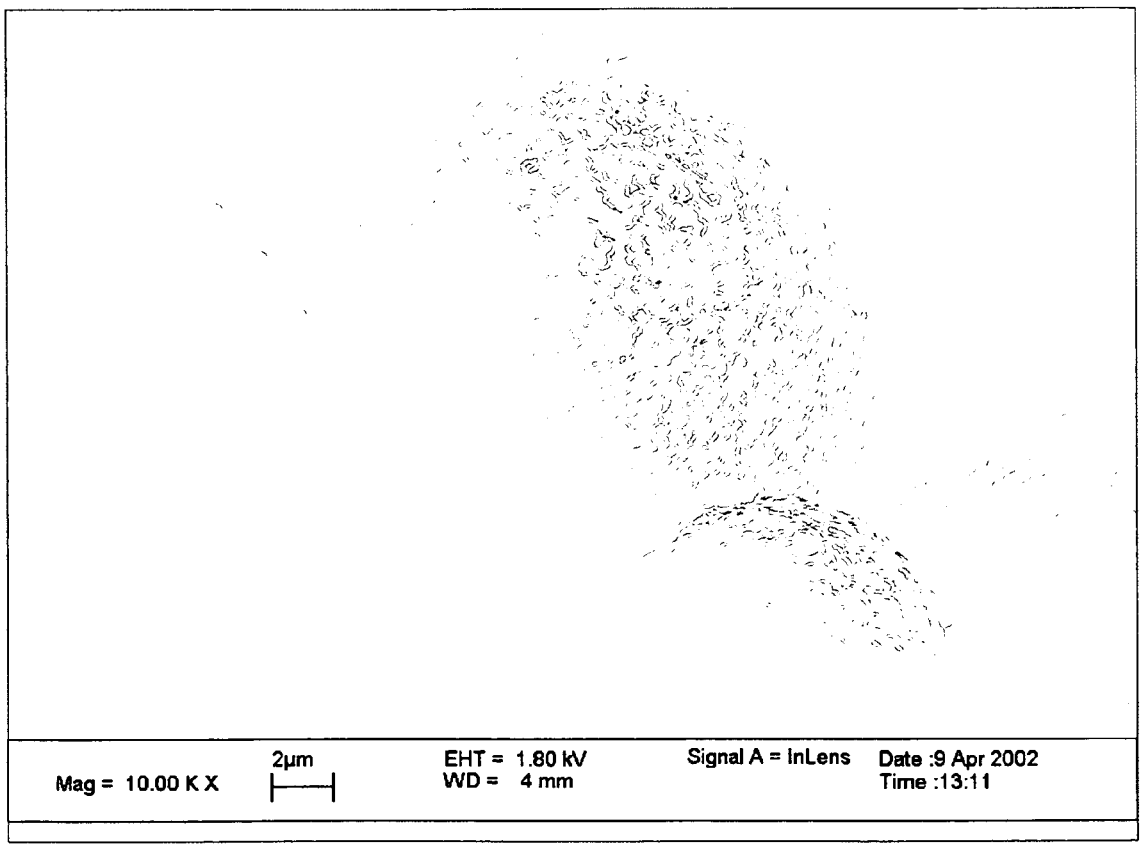
FIG. 2 is a SEM Scanning Electron Microscope photograph of spherical aggregates of the invention.

General Procedure for the Scale-Up of the Inverse Suspension Process with Dean-Stark Distillation Apparatus Latex (30 mL: 9.9 g) is centrifuged twice in distilled water. A defined amount of N,N'-methylenebisacrylamide and of the initiator ammonium persulfate have been added to the aqueous solution of latex. The discontinuous phase obtained is let at room temperature. Continuous phase is prepared by dissolving sorbitan monooleate (13.33 g, C=0.1037 M) in 300 mL of toluene. Then this mixture is purged with nitrogen until temperature reached its equilibrium (T=70° C.). Agitation is maintained at 500 rpm. Then the discontinuous phase is added. After the formation of the aggregates after half an hour, we start to increase the temperature until Dean-Start distillation temperature (T=115° C.). After the reaction had been cooled, the supernatant is removed and then some clean toluene is added. The aggregates are then cleaned with some heptane and dried in an oven at 40° C. The aggregates (see FIG. 2) are separated by sizes using sieves.

The method of the invention is repeated a desired number of times with monosized aggregates, depending on the desired aggregate size of the finished product. In the last round of aggregation the aggregates do not have to be sieved but can be used without the last sieving step if desired.

Thus, the invention provides a fully controllable method of achieving hierarchical structures. The invention provides full control of the size at any level. Furthermore, the spherical aggregates are fully permeable and accessible for chromatography purposes.

Those skilled in the art, having the benefit of the teachings of the present invention as set forth above, can effect numerous modifications thereto. These modifications are to be construed as being encompassed within the scope of the present invention as set forth in the appended claims.

What is claimed is:

1. A method of preparing a separation medium starting with an aqueous solution of essentially spherical primary particles of a defined size, comprising the following steps:
    a) inverse suspension dispersing into oil said aqueous solution of functionalised primary particles to form a droplet in oil dispersion;
    b) evaporating to remove water in said aqueous solution dispersion and to encourage fusion between particles to form spherical aggregates, wherein the fusion is between functional groups on the primary particles and the fusion is caused by a water-soluble polymer and a cross-linker;
    c) size fractionating of aggregates from step b); and optionally
    d) suspending the aggregates from step c) in aqueous solution and repeating steps a) to c) an optional number of times to form progressively larger spherical aggregates.

2. The method of claim 1, wherein the primary particles comprise a synthetic polymer selected from the group consisting of polymerised styrene and/or divinylbenzene, (meth)acrylates, vinyl esters, vinyl ethers, vinyl amides, meth(acrylamides), dienes and mixtures of two or more of the foregoing.

3. The method of claim 1, wherein the primary particles are 50-1000 nm in diameter.

4. The method of claim 1, wherein the fusion in step b) includes thermal fusion of the particles.

5. The method of claim 1, wherein the water-soluble polymer is polyethyleneimine and the cross-linker is chosen from N,N'-methylenebisacrylamide and diacryloyl piperazine.

6. The method of claim 1, wherein the evaporation in step b) is a Dean-Stark distillation.

7. The method of claim 1, further comprising, in a step before step a), derivatizing functional groups of the polymers gel to provide a separation medium, which exhibits one or two different kind of ligands.

* * * * *